No. 748,654. PATENTED JAN. 5, 1904.
D. B. ROBERTS.
FISH TRAP.
APPLICATION FILED NOV. 25, 1902.
NO MODEL.
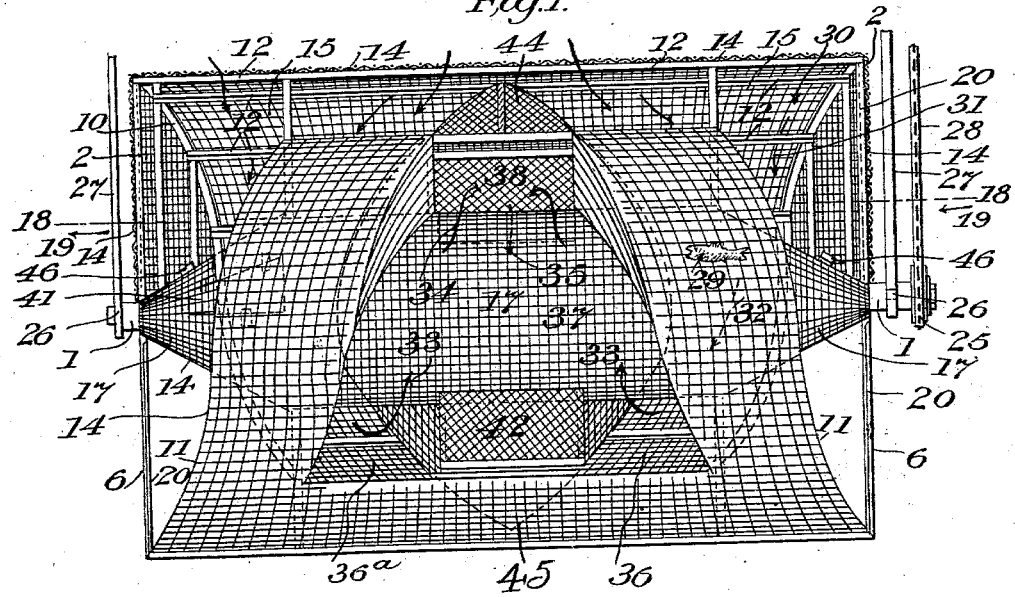
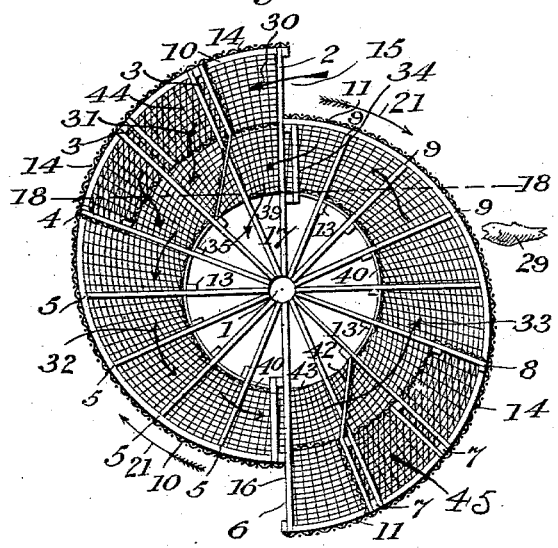
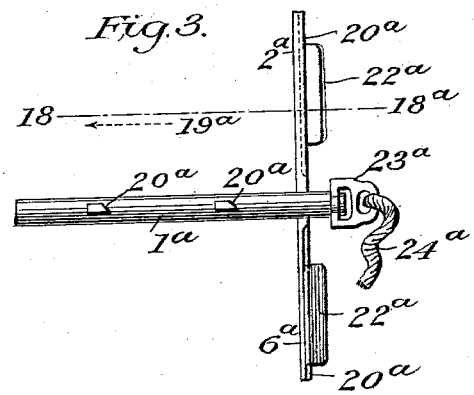
Witnesses:
George W. Hinton
Adam Reed
Inventor:
David B. Roberts No. 748,654. Patented January 5, 1904.

UNITED STATES PATENT OFFICE.

DAVID B. ROBERTS, OF ST. JOSEPH, MISSOURI.

FISH-TRAP.

SPECIFICATION forming part of Letters Patent No. 748,654, dated January 5, 1904.

Application filed November 25, 1902. Serial No. 132,746. (No model.)

*To all whom it may concern:*

Be it known that I, DAVID B. ROBERTS, residing at St. Joseph, in the county of Buchanan and State of Missouri, have invented certain Improvements in Fish-Traps, of which the following is a specification.

My invention relates to improvements in traps for catching and retaining fish, and has for its objects the catching and positively retaining alive without injury of fish from running streams or still water and from which said fish may be taken when desired, and, further, to provide a fish-trap which may either be operated by the current of the water surrounding said trap or by applied power and to so construct a trap that it may be secured in place by a single cable or rope attached to any stationary object. I attain these objects by the mechanism illustrated in the accompanying drawings, in which—

Figure 1 is a side elevation, certain parts being broken away to avoid obscurity. Fig. 2 is a transverse section, cut vertically through the center, of my invention. Fig. 3 is a side elevation of certain details and of swivel attachment.

My invention in its preferred form, as shown, consists, essentially, of a shaft 1, carrying the framework of spokes 2 3 3 4 5 5 5 5 6 7 7 8 9 9 9 9, which carry two rims 10 and two rims 11 and a series of ribs 12 and 13, carrying, preferably, wire-netting 14, so arranged and secured to said spokes, rims, and ribs as to form the two diametrically opposite openings or fish-intakes 15 and 16, which open into their respective chutes, as hereinafter more fully described, formed spirally around and leading into a central compartment or trap 17, the whole provided with means for rotating.

When in operation, my invention is submerged to the depth indicated by the water-line 18, and current of water 18, flowing in the direction indicated by arrow 19, will act as a turbine upon the sloped surfaces 20 of spokes 2 3 4 5 6 7 8 9, more clearly shown in Fig. 3 at 20$^a$, and where current of water 18 is of sufficient speed will cause my entire trap to slowly rotate in the direction indicated by feathered arrows 21, (seen in Fig. 2,) and where current of water 18 has not sufficient speed to cause said rotation of trap inclined blades 22$^a$ (see Fig. 3) may be attached to said spokes. While the trap is being thus rotated it is held in place (see Fig. 3) by swivel 23$^a$ and cable 24$^a$, the free end of said cable being attached to any suitable stationary object. (Not shown.) Where speed of water 18 is altogether insufficient to cause the heretofore-described rotation of trap, said cable 24$^a$ and swivel 23$^a$ are removed from shaft 1$^a$ and a sprocket-wheel 25 is placed upon the equivalent shaft 1, (seen in Fig. 1,) rotated in bearings 26 in uprights 27 by power applied to sprocket-chain 28.

It will be seen from the foregoing that my entire device while in use is constantly but slowly rotated in the direction indicated by feathered arrows 21 (seen in Fig. 2) and that a fish 29 (see Fig. 1) would by said rotation be caused to follow the route as indicated by arrows 30, 31, 32, 33, 34, and 35 into trap 17, through intake 15, spiral chute 36, tapered chute 37, terminal netting 38, through opening 39 (see Fig. 2) into trap 17.

It will be seen by referring to Fig. 2 that after fish 29 has been directed into trap 17 said fish is completely encompassed by netting 40 and netting 14 and surface of water 18, thus positively entrapping and retaining fish 29. When desired, the entire device is lifted either partially or completely from water 18, and fish in trap 17 may be removed through hinged door 41.

Intake 16 and its chutes are an exact duplicate of intake 15 and have their respective parts, including terminal netting 42 and open 43 into trap 17, placed diametrically opposite to the similar parts already described and operate in the same manner.

Deflecting-net 44 divides intake 15 into two spiral chutes 36 and 36$^a$, while deflecting-net 45 performs a similar office for intake 16.

Bait 46 is preferably attached to the cone-shaped ends of trap 17, (see Fig. 1,) but may be secured to any part of the device where desired.

Having fully described my invention, what I claim as new and original, and desire to secure by Letters Patent, is—

1. In a fish-trap, a submerged, fish-retaining central compartment or trap, provided with one or more spirally-arranged chutes, having their inner ends opening into said trap and their outer ends terminating as openings or intakes for fish—the whole provided with means for rotating as specified.

2. In a fish-trap, a submerged, fish-retaining central compartment or trap provided with one or more spirally-arranged chutes, having their inner ends opening into said trap and their outer ends terminating as openings or intakes for fish — the whole formed of netting secured to framework, carried upon spokes having edges suitably beveled or sloped to act as a turbine, as specified.

3. In a fish-trap, a submerged, fish-retaining central compartment or trap, provided with one or more spirally-arranged chutes, having their inner ends opening into said trap and their outer ends terminating as openings or intakes for fish — the whole formed of framework and netting carried upon beveled edged spokes, radially secured to a shaft, having one of its ends rotatably secured to a fixed object by a swivel-attached cable, as specified.

4. In a fish-trap, a submerged, fish-retaining central compartment or trap, provided with spirally-arranged chutes, having their inner ends opening into said trap and their outer ends terminating as openings or intakes for fish; the whole formed of framework and netting carried upon a rotatably-supported shaft, and means for applying power to said shaft, as specified.

In witness whereof I have hereunto set my hand in presence of two witnesses.

DAVID B. ROBERTS.

Witnesses:
GEORGE W. HINTON,
ADAM REED.